Aug. 10, 1954     N. A. NELSON ET AL     2,685,988
SEED DISPENSING MECHANISM FOR PLANTERS
Filed Dec. 22, 1950     2 Sheets-Sheet 1

INVENTORS
NORAL A. NELSON
ULRIC LANDENBERGER
BY Carlson, Pitzner, Hubbard & Wolfe
ATTORNEYS INVENTORS
NORAL A. NELSON
ULRIC LANDENBERGER
BY
Carlson, Pitzner, Hubbard & Wolfe
ATTORNEYS Patented Aug. 10, 1954

2,685,988

UNITED STATES PATENT OFFICE 2,685,988

SEED DISPENSING MECHANISM FOR PLANTERS

Noral A. Nelson and Ulric Landenberger, Detroit, Mich., assignors to Harry Ferguson, Inc., Detroit, Mich., a corporation of Delaware Application December 22, 1950, Serial No. 202,292

6 Claims. (Cl. 222—370)

The invention relates to planting implements and more particularly to improvements in the seed dispensing mechanism for such implements.

One object of the invention is to provide seed dispensing mechanism having a revoluble seed plate mounted and driven in a novel manner which greatly facilitates the manufacture and assembly of the component parts of the mechanism.

Another object is to provide a seed plate mounting and driving arrangement which materially reduces the friction between the plate and associated stationary parts and which effectually eliminates grinding of the seeds between the plate and the stationary parts.

A further object is to provide a false plate construction for seed dispensing mechanisms which permits the plate to be reversibly mounted for use with seed plates of different thicknesses.

Other objects and advantages of the invention will become apparent from the following detailed description of the preferred embodiment illustrated in the accompanying drawings, in which.

Figure 1:
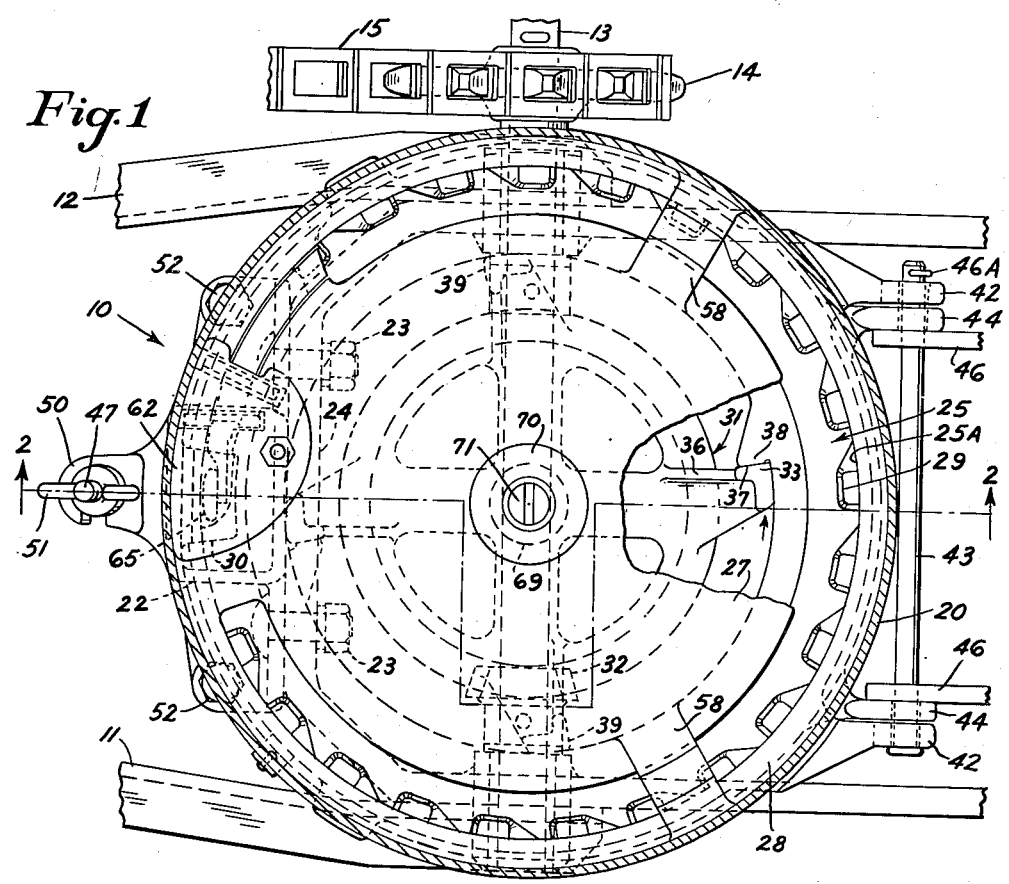
Figure 1 is a plan view of a seed dispensing mechanism embodying the features of the invention, parts of the hopper bottom being broken away to show details of the seed plate and the drive means.

While the invention is susceptible of various modifications and alternative constructions, I have shown in the drawings and will describe in detail the preferred embodiment, but it is to be understood that I do not thereby intend to limit the invention to the specific form disclosed, but intend to cover all modifications and alternative constructions and uses falling within the spirit and scope of the invention as expressed in the appended claims.

For purposes of illustration, the seed dispensing mechanism constituting the present invention has been shown as embodied in a seeding unit 10 adapted for use with various types of row crop planters, as, for example, a planter of the type shown in our copending application Serial No. 165,489 filed June 1, 1950. The unit is mounted on the implement frame, of which longitudinal members 11 and 12 are shown herein, and the dispensing mechanism is driven by a transverse shaft 13 suitably journaled on those frame members. The shaft 13 is driven in well known manner through a sprocket wheel 14 and chain 15 from a rotating part of the planter such as the press wheel, so that its rotative speed is coordinated with the rate of forward movement of the implement relative to the ground.

The seeding unit, which includes a hopper 20 and rotary seed dispensing mechanism 21, is adapted to be mounted on the implement frame adjacent the drive shaft 13 and in operative relation to a conventional boot 22 provided at its lower end with a furrow opener (not shown). The boot 22 comprises a hollow or tubular member and is rigidly attached as by a bolt 23 to a cross member 24 forming a part of the frame structure.

The seed dispensing mechanism 21 comprises generally a seed plate 25 rotatably driven from the shaft 13 and confined within a cylindrical recess or chamber 25a having its top and bottom walls defined by a stationarily mounted supporting member or false plate 26 and an overlying cover plate 27. This cylindrical recess is formed in a member 28 which, in this instance, constitutes the bottom of the hopper and, as is customary, the seed plate 25 has its marginal edge formed with a series of circumferentially spaced notches 29 which cooperate with the side wall of the hopper bottom member to define a series of cells or pockets for retaining measured amounts of the seed with which the hopper 20 is loaded. In the rotation of the plate the seeds caught in the pockets 29 are carried successively to a drop port 30 in the false plate 26 and dropped therethrough into the boot 22 for planting in the usual manner. The cover plate 27 serves to direct the seeds in the hopper onto the marginal edge portion of the seed plate.

The seed plate 25 is driven from the shaft 13 by a driving member 31 rotatable about a vertical axis disposed in overlying relation to the shaft and having a gear element 31a meshing with a bevel pinion 32 keyed to the shaft. For cooperation with the seed plate 25 the driving member 31 is formed with a plurality of rigid arms 33 projecting upwardly and outwardly from the gear element 31A of the member and adapted to extend through a central opening 34 in the false plate 26 and into a similar opening 35 in the seed plate. Each of the arms 33 is formed with a driving face 36 adapted to engage a radially disposed shoulder 37 formed on a lug 38 extending inwardly from the inner margin of the seed plate. Preferably the driving faces and the shoulders are disposed in planes including the axis of rotation of the driving member.

Additionally, each of the driving arms 33 is formed with a radially facing locating surface 39 engageable with the inner peripheral edge of the seed plate for determining the position of the plate. In the exemplary embodiment the driving member 31 is formed with four of the arms 33 while the seed plate is formed to provide two of the shoulders 37, the latter being diametrically opposed for engagement by two of the arms 33 while the other two arms perform only a locating function.

In accordance with the invention, the positioning of the seed plate 25 with respect to the stationary parts of the mechanism and particularly the walls of the chamber 25a in bottom member 28 is simplified and greatly facilitated by mounting the driving member 31 directly on the cover plate 27 which is rigidly attached to or integral with the bottom member 28. Thus the wall of the chamber 25a, the gear mounting structure and the locating faces 39 of the driving member 31 and seed plate 25 may be generated on a common center so that accurate location of the seed plate is automatically insured when the parts are assembled. Machining is simplified since the critical dimensions are all coordinated with a common reference point, namely, the rotational axis of the driving member 31. After the parts are assembled their relative positions are permanently maintained, even when the hopper and dispensing mechanism are removed from the implement.

From the operational standpoint the mounting arrangement above described affords the additional advantage of relieving the bottom member 28 of the necessity of guiding the seed plate in its rotary movement. That function is performed by the locating faces on the arms 33 of the driving member and since those faces have a common center with the wall of the chamber 25a, the seed plate may be dimensioned to afford a slight clearance between its peripheral edge and the wall. This effectively eliminates the rubbing and consequent wear of the parts and materially extends their useful life. Moreover, the seed plate is retained in accurately centered relation with respect to the adjacent wall of the chamber, thus maintaining dimensional uniformity of the seed pockets and effectively preventing entry of seeds between the plate and the wall at any place other than at the pockets whereby grinding of the seeds is avoided.

Figure 2:
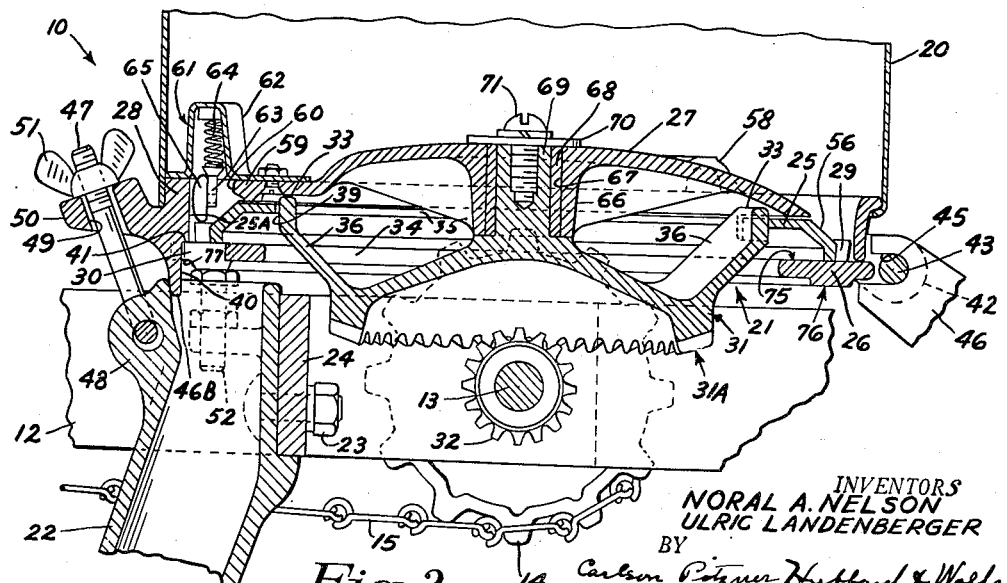
Fig. 2 is a sectional view taken in a plane substantially on the line 2—2 of Fig. 1.
Figure 3:
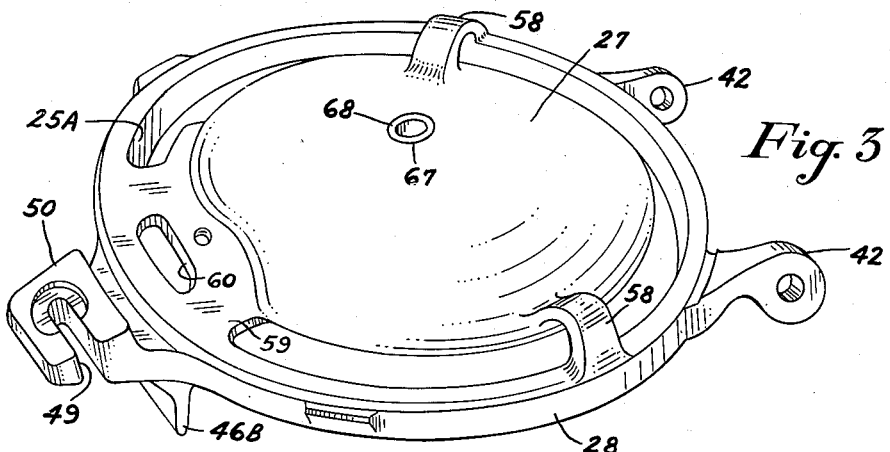
Fig. 3 is a perspective view of the hopper bottom member.
Figure 5:
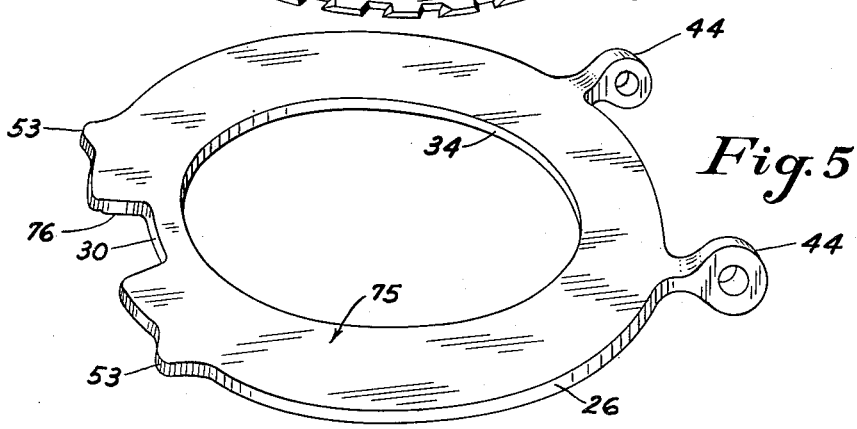
Fig. 5 is a perspective view of the auxiliary bottom member or false plate.
Figure 6:
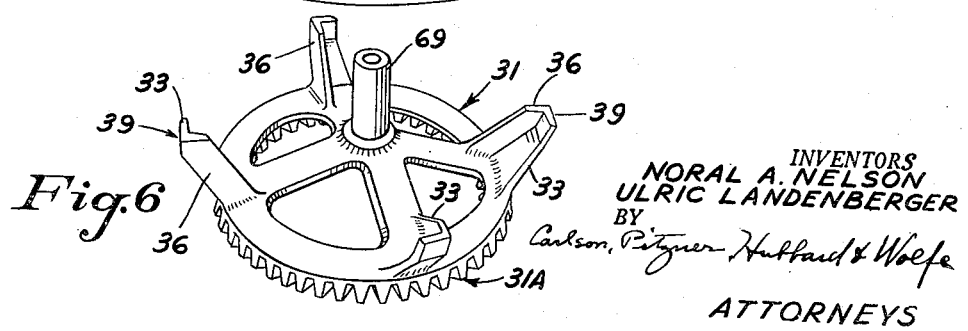
Fig. 6 is a perspective view of the seed plate drive gear.

Turning now to the construction of the exemplary mechanism and referring particularly to Figs. 2 and 5 of the drawings, it will be observed that the false plate 26 comprises a flat generally circular member with the opening 34 substantially centered therein. The plate thus provides a circular bearing surface or track upon which the seed plate 25 slides. The plate 26 is dimensioned to fit within a downwardly opening recess 40 in bottom member 28 substantially concentric with the chamber 25a in the member. Its position within the hopper bottom is determined by an internal downwardly facing shoulder 41 on the member against which the plate abuts when the seeder is set up for operation. The drop port 30, as shown, comprises a radially opening notch in the marginal edge of the plate 26.

To permit quick and easy removal and replacement of the seed plate 25, the hopper 20 and the false plate 26 are independently hinged to the implement frame. For this purpose the bottom member 28 is formed with a pair of spaced parallel hinge lugs 42 apertured to receive a transversely disposed hinge pin 43. The false plate 26 is similarly formed with a pair of hinge lugs 44 adapted to extend between and closely adjacent the hinge lugs 42 and apertured to receive the pivot pin 43.

In the exemplary implement the hinge pin 43 is received in notches 45 formed in upstanding bracket arms 46 rigidly secured to the implement frame. The notches open at one side of the arms to allow withdrawal of the hinge pin and thus complete detachment of the hopper and the false plate from the implement when desired. A retaining element such as a cotter pin 46a maintains the hinge pin and associated parts in assembled relation.

To retain the parts in assembled relation the bottom member 28 is formed at the side opposite the hinge lugs with a depending tongue 46B adapted to extend within the open upper end of the boot 22 and to engage a suitable cam surface formed on the wall of the boot. The arrangement is such that the bottom member and the associated parts are urged to the right as viewed in Fig. 2, thus effectively retaining the hinge pin 43 in the slots 45.

Accidental disengagement of the hinge pin is prevented by a locking bolt 47 having its lower end hooked into an apertured lug 48 projecting from the wall of the boot 22. The upper end of the bolt is adapted to engage in a laterally opening slot 49 in a latching lug 50 integral with the bottom member 28. A wing nut 51 threaded on the end of the bolt provides means for securely clamping the hopper and dispensing mechanism assembly in operating position. This position is determined by a pair of adjustable stops herein shown as bolts 52 threaded into lugs projecting from the boot 22 and having their heads positioned for engagement by stop engaging ears 53 formed on the false plate 26.

Figure 4:
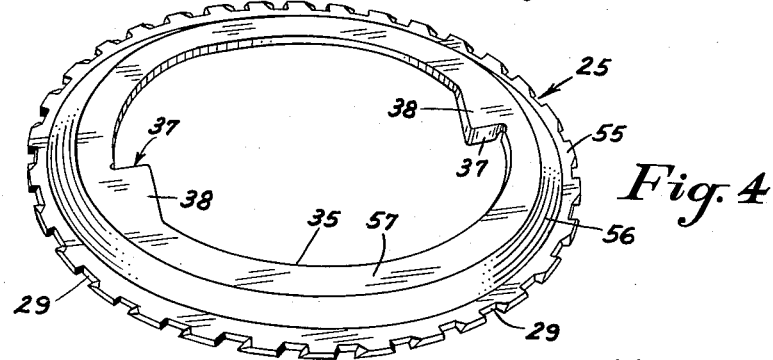
Fig. 4 is a perspective view of a typical seed plate for use with the mechanism.

As will be seen by reference to Figs. 2 and 4 of the drawings, the seed plate 25 is in the form of an annulus having a flat marginal edge portion 55 in which the notches 29 are formed. The thickness of this portion of the plate is determined, of course, by the character of the seed for which the plate is designed. In other words, different plates are provided for seeds of different size, such as cotton, beans, corn, etc., as has been the practice heretofore and a plurality of selected plates are commonly furnished with each implement.

An upwardly inclined web 56 connects the edge portion 55 of the seed plate with an inwardly directed flat portion 57 on which the driving lugs 38 are formed. This flat portion 57 underlies the marginal edge of the cover plate 27 which thus acts to confine the seed plate against upward movement with respect to the false plate 26.

The cover plate 27 is slightly larger in diameter than the opening 35 in the seed plate and is disposed concentrically of the latter so as to effectively cover the opening. The marginal edge portion of the seed plate is thus exposed within the hopper 20 so that the seeds within the hopper tend to gravitate into the cells or pockets 29 in the plate. The cover plate is preferably crowned to assist in directing the seeds to the edge of the seed plate.

In the preferred form of the mechanism illustrated the cover plate 27 is rigidly joined to the bottom member 28 by a series of bridging elements, there being three such elements in the present instance including a pair of generally U-shaped elements 58 and a flat element 59. The latter element is of substantial width and is positioned above the drop port 30 in the false plate 26. An elongated aperture 60 in the bridging element 59 provides for the accommodation of a knocker 61 which may be of any preferred construction. As herein shown, the knocker comprises a bracket 62 attached to the upper face of the bridging element. A plunger 63 supported on the bracket is urged downwardly through the opening 60 toward the seed plate by a spring 64. The plunger carries at its lower end a roller 65 arranged to run along the top of the seed plate and to drop into successive seed pockets 29 as they register with the drop port 30 to positively expel any seeds that might otherwise stick in the pockets.

For supporting the seed plate drive member 31 on the cover plate 27, the latter is formed with a depending hub 66 having a cylindrical aperture 67 dimensioned to receive a bushing 68 which provides a bearing for a stub shaft 69 integral with or rigidly secured to the driving member coaxially of the gear element 31a. A retaining element 70 in the form of a washer secured to the end of the shaft 69 as by a screw 71 overlies the adjacent edge of the cover plate and serves to maintain the driving member in assembled relation therewith.

It will be readily apparent that the above construction materially simplifies the manufacture of the component parts of the seed dispensing mechanism. Since the seed plate enclosing wall 25a of the bottom member 28 and the bearing aperture 67 in the hub 66 have a common center, they may be accurately produced by simple machining operations. Likewise, the cooperating locating surfaces of the driving member and the seed plate are easily formed since both are coordinated with the axis of the shaft 69 which is received within the hub 66. Thus the parts when manufactured to predetermined dimensions may be assembled without any special fitting and without taking into consideration any variations in the position of the hopper assembly with reference to the drive shaft 13 and associated parts. Furthermore, the seed plates may be interchanged without disturbing the relationship of the parts and a proper fitting is insured and uniformity of the seed retaining pockets is maintained at all times. Such uniformity, together with the constant clearance between the edge of the seed plate and the adjacent wall of the bottom member eliminates any tendency to grind the seeds being dispensed by the mechanism.

Interchange of seed plates is effected in the same manner as in conventional seeding mechanisms. It is merely necessary to unscrew the wing nut 51 until the latch bolt 47 can be rocked out of the slot 49. The hopper 20 and its associated bottom member 28 may then be rocked about the hinge pin 43 carrying with them the driving member 31. The seed plate is thus disengaged from the driving member and left resting freely on the false plate 26 from which it may be lifted and replaced by another plate.

As explained above, the seed plate 25 rides on the top surface of the false plate 26 which, in addition to providing a bearing for the seed plate, also serves to hold it substantially in sliding contact with the cover plate 27. In accordance with the invention, the false plate 26 is constructed in a novel manner to enable it to operate with seed plates of two different thicknesses, thus reducing by one-half the number of false plates required for a given set of seed plates. For this purpose the false plate 26 is constructed to provide on one face a bearing surface 75 located in a plane positioned with respect to a plane normal to the axis of the hopper 20 and including the hinge axis of the plate so as to afford sufficient space below the cover plate 27 for the accommodation of a seed plate of a given thickness. The false plate 26 is shown in Fig. 2 with the bearing surface 75 in the operative position as defined by the hinge axis and the locating abutment 41 on the hopper bottom member.

The other face of the false plate 26 is formed to provide a bearing surface 76 located in a plane differently spaced, in this instance farther from the plane of the hinge axis and abutment than the first mentioned bearing surface. Accordingly, when the false plate is installed with the bearing surface 76 facing upwardly or in operative position, a narrower space is provided for the accommodation of the seed plate. The edge of the plate adjacent the abutment 41 is recessed as at 77 to assist in locating the bearing surface with respect to the bottom of the cover plate. Accordingly, by installing the false plate in one or the other of its two positions either of two different sized seed plates may be accommodated.

To reverse or interchange false plates, the latch bolt 47 is released and the hopper assembly is detached from the implement by sliding the hinge pin 43 out of its retaining slots 45. When so detached the hinge pin may be withdrawn from the hinge lugs 42 and 44 to completely free the false plate for reversal or for substitution of a differently dimensioned plate, as required. The hinge pin may then be reinserted in the hinge lugs and the assembly replaced on the implement, as previously described.

It will be apparent from the foregoing that the invention provides seed dispensing mechanism of novel and advantageous construction. The mounting of the seed plate driving member directly on the hopper bottom member instead of on the implement frame as heretofore, simplifies manufacture of the parts of the mechanism. Thus the bearing for the driving member and the wall which, together with the seed plate, defines the seed retaining pockets, can be formed on a common center. Moreover, since the driving member is definitely and permanently located with respect to the hopper bottom, the driving arms of the member may be utilized to advantage for positioning the seed plate. The bottom member is thus relieved of the necessity of guiding the seed plate in its rotation so that wear of the parts is materially reduced. In addition the seed plate is maintained accurately centered in the hopper bottom member so that grinding of the seeds is effectually eliminated. In general, therefore, it will be evident that the improved construction affords substantial advantages not only in the manufacture and assembly of the mechanism but also in its operation.

We claim:

1. In a planter, in combination, a frame, a rotatably driven shaft journaled on said frame, a seed hopper having a bottom member supported on said frame above said shaft, an annular false plate disposed between said hopper bottom member and said shaft, an annular seed plate confined between said false plate and said bottom member, said bottom member and said annular false plate being mounted to permit separation thereof for removal of said seed plate, a driving member including a gear element driven by said shaft, bearing means supporting said driving member on said bottom member coaxially of said false plate and said seed plate, the central openings of said annular false plate and said annular seed plate being of a size to permit passage of said driving member therethrough upon separation of said bottom member and annular false plates, and means on said driving member disengageable with said seed plate for imparting rotation to the plate and for maintaining it in centered relation to said bottom member.

2. In a planter having a frame having a pinion journaled thereon for rotation about a horizontal axis, a seed hopper having a bottom member defining a cylindrical recess, an annular seed plate rotatable in said recess, a cover plate rigid with said bottom member and overlying the central portion of said seed plate, an annular false plate underlying said bottom member and providing a bearing for said seed plate, said bottom member and said annular false plate being pivotally mounted on said frame to swing about a horizontal axis away from said pinion, a driving member including a gear element coacting with the pinion on said frame, means on said driving member engageable with said seed plate to drivingly connect the same, a shaft rigid with said driving member, and a bearing in said cover plate for said shaft including means for retaining said shaft against axial sliding out of said bearing, said bearing supporting said driving member concentrically within said recess, the central openings in said annular seed plate and said annular false plate being greater than said gear element to permit said driving member to pass therethrough, and said engaging means acting to center said seed plate in the recess.

3. The combination with a seed hopper having a bottom member defining a cylindrical recess, an annular seed plate disposed within the recess, a cover plate rigid with the hopper bottom member overlying the central portion of said seed plate, an annular false plate supporting said seed plate, said bottom member and said annular false plate being relatively separable, a bearing formed in said cover plate and having a common center with the cylindrical recess, a driving member journaled in said bearing and projecting through said seed plate and said false plate, and upwardly extending rigid arms on said driving member having sidewise facing surfaces engageable with said seed plate to establish a driving connection therewith, said arms also having radially facing locating surfaces operative to position said seed plate within said recess, said sidewise facing and radially facing surfaces being positioned to permit upward sliding of said driving member and rigid arms relative to said annular seed plate.

4. Seed dispensing mechanism for planters comprising, in combination, a driving member rotatable about a vertical axis, a member defining a cylindrical wall around said member, an annular false plate encircling said driving member and located adjacent the lower end of said wall, said false plate having a drop port in its marginal edge, an annular seed plate supported on said false plate and forming with said wall a series of seed retaining pockets registrable sequentially with said port in the rotation of the seed plate, a cover plate rigid with said wall defining member and overlying said seed plate, said cover plate having bearing means supporting said driving member for rotation coaxially of said wall, and rigid arms on said driving member extending upwardly and outwardly therefrom, said annular seed plate having a radially disposed shoulder for abutting the side of said arms to provide a disengageable driving connection between said driving member and said seed plate, said arms and said seed plate having coacting opposed radially facing locating surfaces for maintaining the seed plate accurately positioned with respect to said wall in the rotation of the plate, the central openings of said annular false plate and said annular seed plate being of sufficient size to permit passage of said driving member upwardly therethrough from said engaged position of the latter.

5. In a planter having a frame with a horizontally disposed drive shaft journaled thereon, a seed hopper having a bottom member disposed in overlying relation to the shaft and hinged to the frame to swing about an axis parallel to and spaced laterally from the shaft, an annular false plate disposed between said hopper bottom member and the shaft and hinged to the frame to swing about the same axis as said hopper, said false plate cooperating with said bottom member to define a chamber for the reception of a seed plate, a seed plate rotatable in said chamber, a member adapted to be driven from the shaft and having a driving connection with said seed plate, and bearing means on said bottom member supporting said driving member for rotation about an axis concentric with said chamber, said driving member being secured to said bottom member for movement therewith out of driving engagement with the shaft when said hopper is swung on its hinge to a retracted position.

6. Seed dispensing mechanism for a planter having a horizontally disposed drive shaft comprising, in combination, an annular seed plate, an annular member positioned above the said drive shaft forming the bottom of a seed hopper and defining a cylindrical chamber for said seed plate, an annular false plate positioned between said annular bottom member and the said drive shaft for supporting said seed plate within said chamber, said annular bottom member and said annular false plate being pivotally mounted on a horizontal axis to swing away from said drive shaft, a cover plate rigid with said member and overlying said seed plate, a vertical driving member having a gear element for engaging said drive shaft, said driving member extending through said seed plate and said false plate, said driving member and said seed plate having coacting driving and locating surfaces, and a bearing on said cover plate for rotatably supporting said driving member for axial movement thereof with said cover plate upon upward pivotal movement of said annular bottom member to disengage said gear element and the said coacting driving and locating surfaces of said driving element, the walls of said chamber, said bearing and said locating surfaces all having a common central axis coincident with the axis of said driving member for positioning said annular elements and drive member with respect to each other.

References Cited in the file of this patent

UNITED STATES PATENTS

| Number | Name | Date |
| --- | --- | --- |
| 307,457 | Graze | Nov. 4, 1884 |
| 650,772 | Avery | May 29, 1900 |
| 1,062,449 | Ford | May 20, 1913 |
| 1,247,738 | Strandlund | Nov. 27, 1917 |
| 2,240,610 | Dean | May 6, 1941 |
| 2,361,123 | Ratcliff | Oct. 24, 1944 |